United States Patent
Lai et al.

(10) Patent No.: US 12,531,483 B2
(45) Date of Patent: Jan. 20, 2026

(54) SWITCHABLE POWER SUPPLY CIRCUIT FOR REALIZING VARIOUS SWITCHING CONVERTERS

(71) Applicant: NOVATEK Microelectronics Corp., Hsin-Chu (TW)

(72) Inventors: Wei-Jen Lai, Yilan County (TW); Jen-Hao Liao, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 456 days.

(21) Appl. No.: 17/563,091

(22) Filed: Dec. 28, 2021

(65) Prior Publication Data

US 2023/0208295 A1    Jun. 29, 2023

(51) Int. Cl.
H02M 3/158    (2006.01)
H02M 3/07    (2006.01)

(52) U.S. Cl.
CPC ............. *H02M 3/158* (2013.01); *H02M 3/07* (2013.01); *H02M 3/1582* (2013.01)

(58) Field of Classification Search
CPC ...... H02M 3/158; H02M 3/07; H02M 3/1582; H02M 1/008; Y02B 70/10
See application file for complete search history.

(56) References Cited

U.S. PATENT DOCUMENTS

| | | | | |
|---|---|---|---|---|
| 6,643,151 B1 * | 11/2003 | Nebrigic | ................. | H02M 3/07 363/124 |
| 7,443,206 B1 * | 10/2008 | Fernandez | ............ | H03L 7/0891 327/12 |
| 2012/0098579 A1 * | 4/2012 | Schober | ................ | H03L 7/0895 327/536 |
| 2013/0249438 A1 | 9/2013 | Oikarinen | | |
| 2015/0226351 A1 | 8/2015 | Bolz | | |
| 2016/0094214 A1 * | 3/2016 | Liu | ........................ | H02M 3/07 327/113 |
| 2017/0040898 A1 * | 2/2017 | Hong | ................... | H02M 3/1582 |
| 2018/0331629 A1 | 11/2018 | Luccato | | |
| 2021/0159794 A1 * | 5/2021 | Cho | ..................... | H02M 3/1582 |
| 2022/0311339 A1 * | 9/2022 | Yen | ........................ | H02M 3/158 |

FOREIGN PATENT DOCUMENTS

| | | | |
|---|---|---|---|
| CN | 102958233 A | | 3/2013 |
| CN | 103179736 A | | 6/2013 |
| CN | 102055335 B | * | 8/2015 |
| CN | 214281707 U | | 9/2021 |

* cited by examiner

*Primary Examiner* — Jue Zhang
*Assistant Examiner* — Jye-June Lee
(74) *Attorney, Agent, or Firm* — Winston Hsu

(57) ABSTRACT

A power supply circuit for a switching converter includes a power stage and a signal selector. The power stage has a first voltage port, a second voltage port, a third voltage port and a fourth voltage port, and has a first device terminal and a second device terminal configured to be coupled to a power storage device. The power stage includes a first switch coupled between the first voltage port and the first device terminal, a second switch coupled between the second voltage port and the second device terminal, a third switch coupled between the third voltage port and the first device terminal, and a fourth switch coupled between the fourth voltage port and the second device terminal. The signal selector, coupled to the power stage, is configured to select one of a plurality of control signals to be output to each of the first to fourth switches.

15 Claims, 14 Drawing Sheets

SWITCHABLE POWER SUPPLY CIRCUIT FOR REALIZING VARIOUS SWITCHING CONVERTERS

BACKGROUND OF THE INVENTION

1. Field of the Invention

The present invention relates to a power supply circuit for a switching converter, and more particularly, to a universal power stage of the power supply circuit applicable to various types of switching converters.

2. Description of the Prior Art

In the technology field of display driver integrated circuit (IC), different display panels usually have different loadings due to the application scope and panel size. For example, the display panels implemented on a wearable device, mobile phone and tablet usually have different sizes, which are accompanied by different loadings. The display panels usually require stable voltage supply for operations, and different types of panels, such as a liquid crystal display (LCD) and an organic light-emitting diode (OLED) panel, usually have different requirements of voltage ranges. Accordingly, the display driver IC should be equipped with appropriate switching converter circuits to satisfy the requirements of panels. The common switching converter may be a switching-capacitor converter or a switching-inductor converter. In general, the switching-capacitor converter is suitable for light current loading, and has higher power transmission efficiency within a smaller voltage range. The switching-inductor converter is suitable for heavy current loading, and has higher power transmission efficiency in a larger voltage range.

However, the switching converter is usually requested to supply large currents, and thus a switching transistor with a large size should be included, which occupies a large area in the display driver IC. Further, the deployment of capacitor or inductor requires additional I/O pads. Under the limited pad count and chip area of the display driver IC, it is not easy to satisfy both the light loading requirement and heavy loading requirement simultaneously by deploying one switching converter in the display driver IC. Thus, there is a need for improvement over the prior art.

SUMMARY OF THE INVENTION

It is therefore an objective of the present invention to provide a universal power stage for various types of switching converters, so as to realize the switching-capacitor converter and the switching-inductor converter in the display driver integrated circuit (IC).

An embodiment of the present invention discloses a power supply circuit for a switching converter. The power supply circuit comprises a power stage and a signal selector. The power stage has a first voltage port, a second voltage port, a third voltage port and a fourth voltage port, and has a first device terminal and a second device terminal configured to be coupled to a power storage device. The power stage comprises a first switch, a second switch, a third switch and a fourth switch. The first switch is coupled between the first voltage port and the first device terminal. The second switch is coupled between the second voltage port and the second device terminal. The third switch is coupled between the third voltage port and the first device terminal. The fourth switch is coupled between the fourth voltage port and the second device terminal. The signal selector, coupled to the power stage, is configured to select one of a plurality of control signals to be output to each of the first switch, the second switch, the third switch and the fourth switch.

Another embodiment of the present invention discloses a power supply circuit for a switching converter. The power supply circuit comprises a power stage and a signal selector. The power stage has a first voltage port, a second voltage port, a third voltage port and a fourth voltage port, and has a first device terminal and a second device terminal configured to be coupled to a capacitor. The power stage comprises a first switch, a second switch, a third switch and a fourth switch. The first switch is coupled between the first voltage port and the first device terminal. The second switch is coupled between the second voltage port and the second device terminal. The third switch is coupled between the third voltage port and the first device terminal. The fourth switch is coupled between the fourth voltage port and the second device terminal. The signal selector, coupled to the power stage, is configured to receive a first switching control signal and a second switching control signal from a signal controller of the switching converter, select the first switching control signal to control the first switch and the second switch, and select the second switching control signal to control the third switch and the fourth switch.

Another embodiment of the present invention discloses a power supply circuit for a switching converter. The power supply circuit comprises a power stage and a signal selector. The power stage has a first voltage port, a second voltage port, a third voltage port and a fourth voltage port, and has a first device terminal and a second device terminal configured to be coupled to an inductor. The power stage comprises a first switch, a second switch, a third switch and a fourth switch. The first switch is coupled between the first voltage port and the first device terminal. The second switch is coupled between the second voltage port and the second device terminal. The third switch is coupled between the third voltage port and the first device terminal. The fourth switch is coupled between the fourth voltage port and the second device terminal. The signal selector, coupled to the power stage, is configured to receive a first switching control signal and a second switching control signal from a signal controller of the switching converter, select an always-on signal to control the first switch, select the first switching control signal to control the second switch, select an always-off signal to control the third switch, and select the second switching control signal to control the fourth switch.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
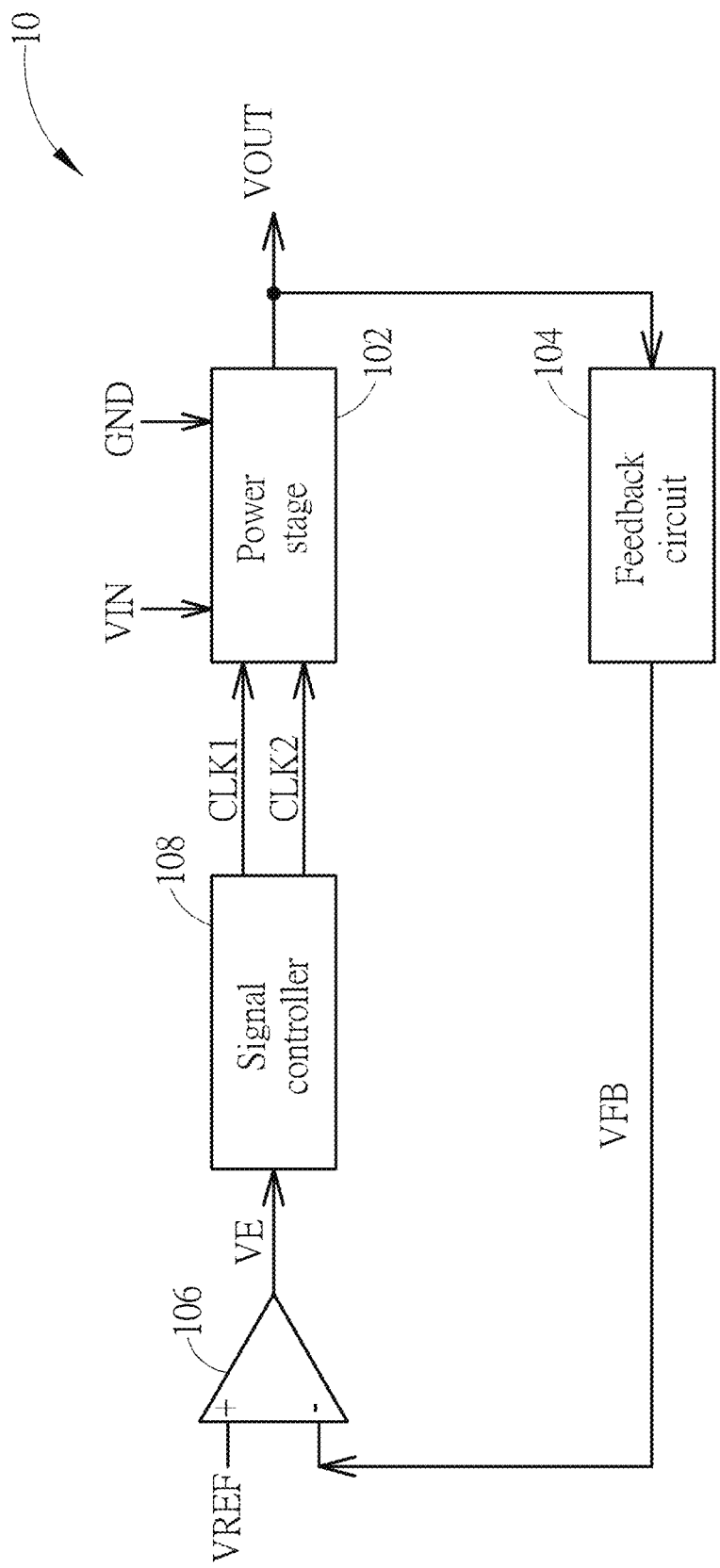
FIG. 1 is a schematic diagram of a general switching converter.

Please refer to FIG. 1, which is a schematic diagram of a general switching converter 10. The switching converter 10, which may be served as a power supply device of an electronic system or apparatus, is configured to output a regulated output voltage VOUT by receiving an input voltage VIN. As shown in FIG. 1, the switching converter 10 includes a power stage 102, a feedback circuit 104, an error amplifier 106 and a signal controller 108.

In detail, the power stage 102 is composed of a passive device and several switching transistors, where the passive device may be a capacitor or an inductor. The power stage 102 is configured to output the output voltage VOUT based on the received input voltage VIN and a ground voltage GND. The feedback circuit 104, which provides a feedback loop for the switching converter 10, may generate a feedback signal VFB according to the output voltage VOUT. For example, the feedback circuit 104 may include a voltage divider, and the generated feedback signal VFB may be a division of the output voltage VOUT. The error amplifier 106 may generate an error signal VE based on the difference of a reference voltage VREF and the feedback signal VFB. The signal controller 108 then processes the error signal VE to generate switching control signals CLK1 and CLK2 to be output to the power stage 102, where the switching control signals CLK1 and CLK2 may control the power transistors to be turned on or off. Based on the structure of the power stage 102, the switching converter 10 may be a charge pump, buck converter, boost converter, or any other type of voltage converter.

Figure 2A:
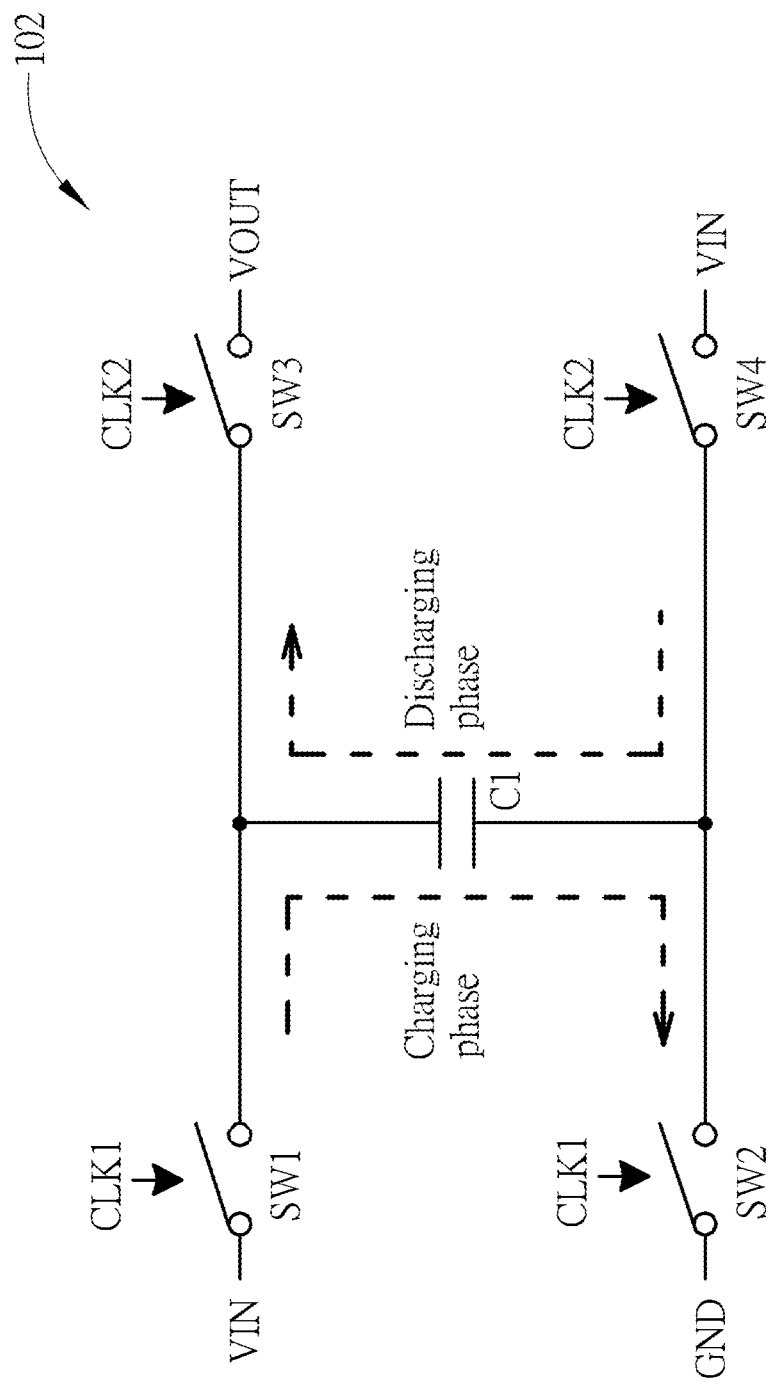
FIGS. 2A-2C illustrate implementations of the power stage in the general switching converter.

FIG. 2A illustrates an implementation of the power stage 102, which realizes a charge pump. The charge pump includes a capacitor C1 and four switches SW1-SW4. The switching control signal CLK1 is used to control the switches SW1 and SW2, and the switching control signal CLK2 is used to control the switches SW3 and SW4. The switches SW1 and SW3 are coupled to a terminal of the capacitor C1, and the switches SW2 and SW4 are coupled to another terminal of the capacitor C1. In the charge pump, the input voltage VIN is received through the switches SW1 and SW4, and the ground voltage GND is received through the switch SW2. The output voltage VOUT is output through the switch SW3.

The charge pump has two operation phases: a charging phase and a discharging phase. In the charging phase, the switches SW1 and SW2 are turned on and the switches SW3 and SW4 are turned off, and the capacitor C1 is charged through a charging path from the input terminal of VIN to the ground terminal. In the discharging phase, the switches SW3 and SW4 are turned on and the switches SW1 and SW2 are turned off, and the capacitor C1 is discharged through a discharging path to the output terminal of VOUT. At this moment, the output voltage VOUT will be boosted to approximately twice the input voltage VIN.

Figure 2B:
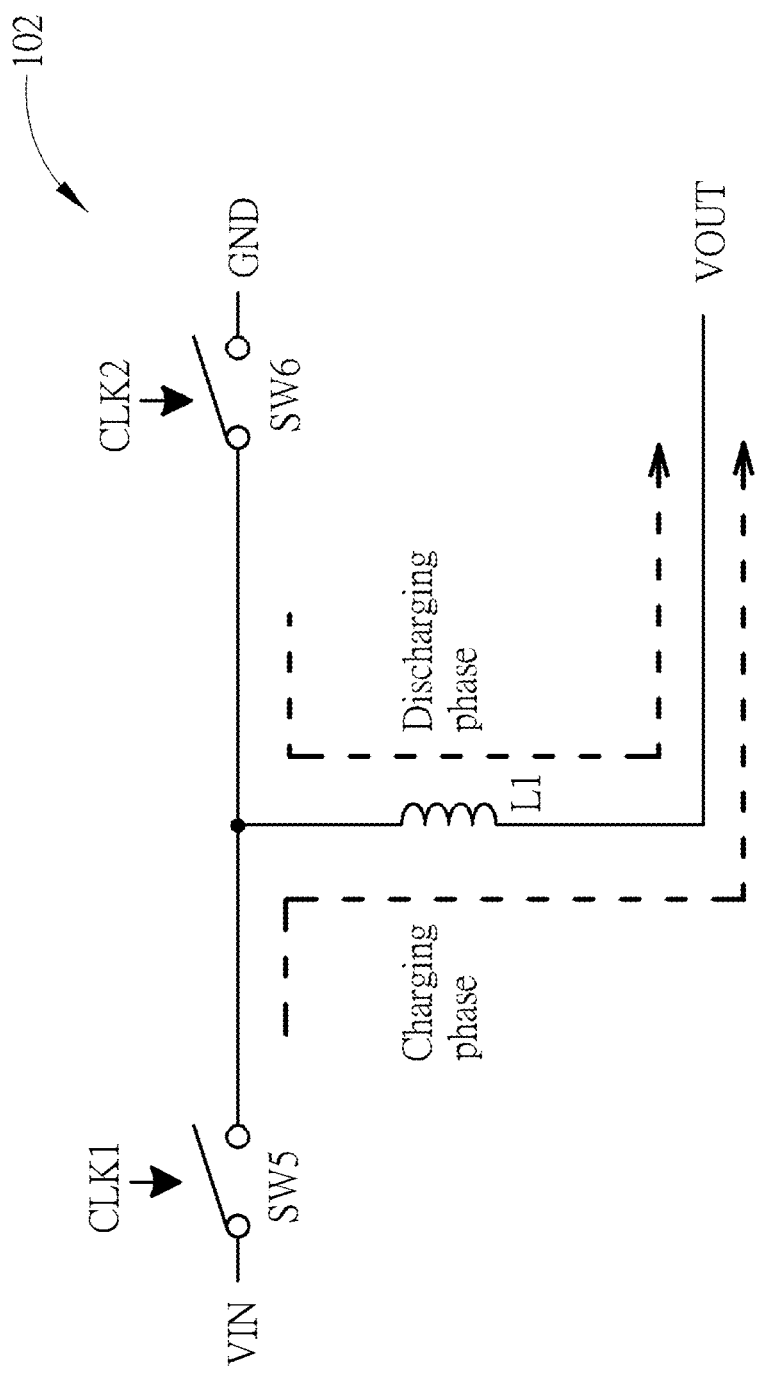

FIG. 2B illustrates another implementation of the power stage 102, which realizes a buck converter. The buck converter includes an inductor L1 and two switches SW5 and SW6. The switching control signal CLK1 is used to control the switch SW5, and the switching control signal CLK2 is used to control the switch SW6. The switches SW5 and SW6 are coupled to a terminal of the inductor L1, and another terminal of the inductor L1 is further coupled to the output terminal of the buck converter, for outputting the output voltage VOUT. The input voltage is received through the switch SW5, and the ground voltage GND is received through the switch SW6.

The buck converter has two operation phases: a charging phase and a discharging phase. In the charging phase, the switch SW5 is turned on and the switch SW6 is turned off, and the inductor L1 is charged through a charging path from the input terminal of VIN to the output terminal of VOUT. In the discharging phase, the switch SW6 is turned on and the switch SW5 is turned off, and the inductor L1 is discharged through a discharging path from the ground terminal to the output terminal of VOUT. At this moment, the output voltage VOUT will be equal to VIN×D, where D equals the period length of the charging phase divided by the total period length of the charging phase and the discharging phase.

Figure 2C:
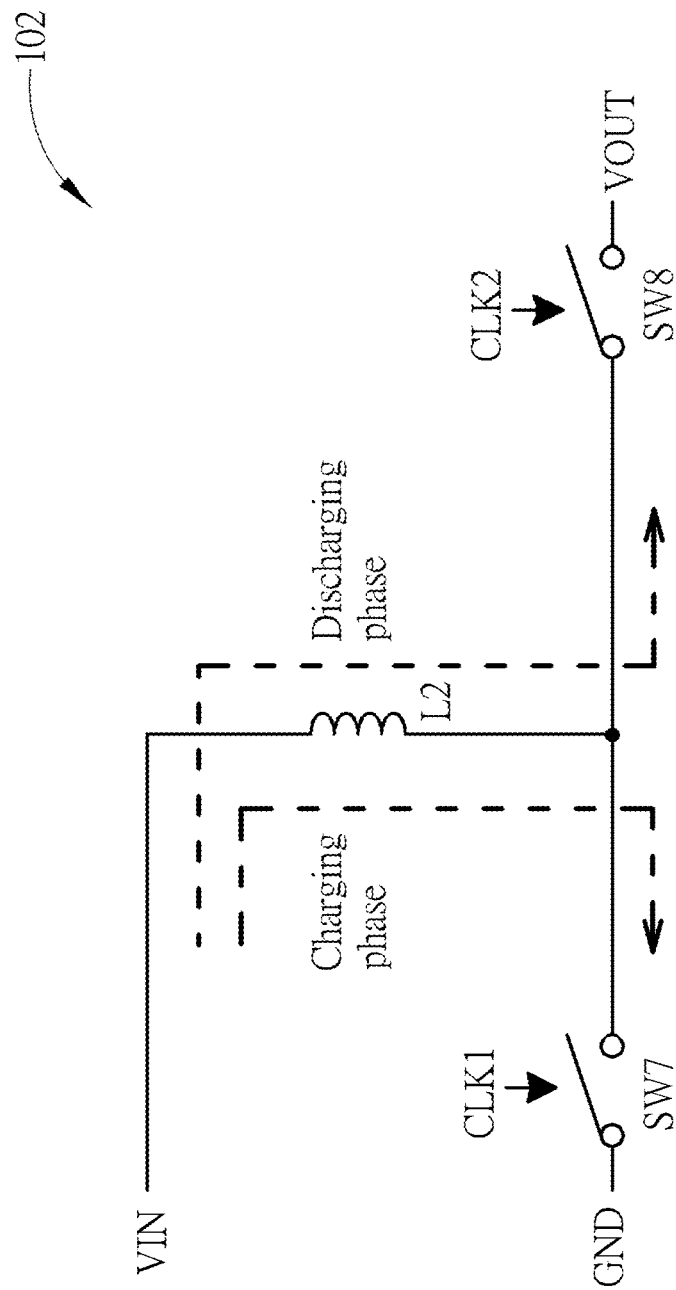

FIG. 2C illustrates a further implementation of the power stage 102, which realizes a boost converter. The boost converter includes an inductor L2 and two switches SW7 and SW8. The switching control signal CLK1 is used to control the switch SW7, and the switching control signal CLK2 is used to control the switch SW8. The switches SW7 and SW8 are coupled to a terminal of the inductor L2, and another terminal of the inductor L2 is further coupled to the input terminal of the boost converter, for receiving the input voltage VIN. The ground voltage GND is received through the switch SW7, and the switch SW8 is coupled to the output terminal of the boost converter, for outputting the output voltage VOUT.

The boost converter also has two operation phases: a charging phase and a discharging phase. In the charging phase, the switch SW7 is turned on and the switch SW8 is turned off, and the inductor L2 is charged through a charging path from the input terminal of VIN to the ground terminal. In the discharging phase, the switch SW8 is turned on and the switch SW7 is turned off, and the inductor L2 is discharged through a discharging path from the input terminal of VIN to the output terminal of VOUT. At this moment, the output voltage VOUT will be equal to VIN/(1−D), where D equals the period length of the charging phase divided by the total period length of the charging phase and the discharging phase.

As shown in FIGS. 2A-2C, the charge pump, buck converter and boost converter have their respective power stage structure, and thus can only achieve their respective voltage supply function. However, since each power stage is composed of several switching transistors in conjunction with an external passive device such as the capacitor or inductor, the present invention may provide a universal power stage structure, which can be adaptive to the applications of switching-capacitor converter (such as the charge pump circuit) and the switching-inductor converter (such as the buck converter and the boost converter) with appropriate configurations, to be applicable to various requirements of different voltage levels and different loadings.

Figure 3:
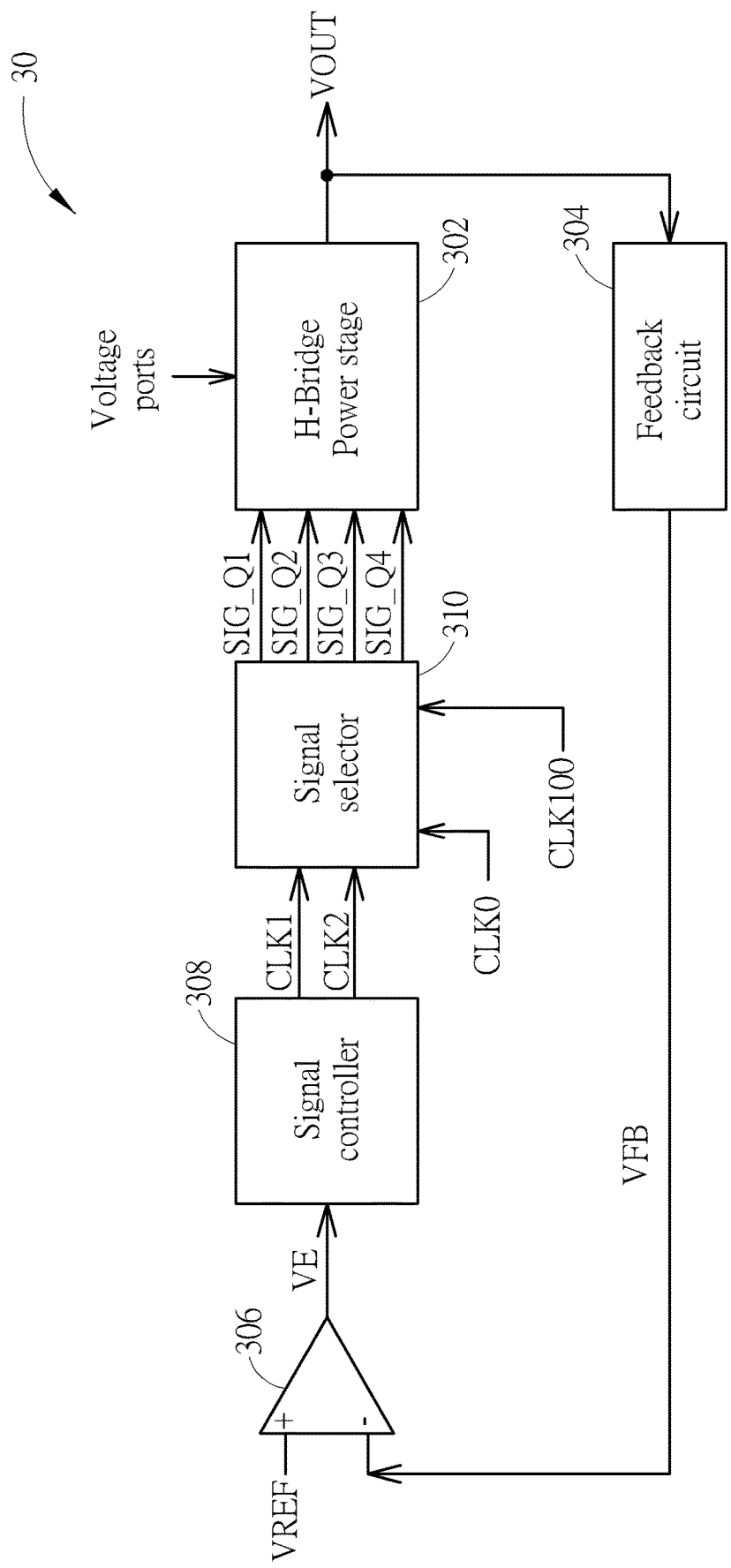
FIG. 3 is a schematic diagram of a switching converter according to an embodiment of the present invention.

Please refer to FIG. 3, which is a schematic diagram of a switching converter 30 according to an embodiment of the present invention. Similarly, the switching converter 30 may output a regulated output voltage VOUT by receiving an input voltage VIN, to be served as a power supply device of an electronic system or apparatus. In an embodiment, the switching converter 30 may be implemented in a display driver integrated circuit (IC), to supply the output voltage VOUT to a source driver for driving a display panel.

As shown in FIG. 3, the switching converter 30 includes an H-bridge power stage 302, a feedback circuit 304, an error amplifier 306, a signal controller 308 and a signal selector 310. The operations of the feedback circuit 304, the error amplifier 306 and the signal controller 308 are similar to those of the feedback circuit 104, the error amplifier 106 and the signal controller 108, respectively, and will not be repeated herein. The switching converter 30 and the switching converter 10 differ in that the H-bridge power stage 302 and the power stage 102 have different structures, and the switching converter 30 further includes the signal selector 310 for selectively outputting control signals SIG_Q1-SIG_Q4 to the H-bridge power stage 302.

In detail, the signal controller 308 may output switching control signals CLK1 and CLK2 to the signal selector 310. The signal selector 310 may output the control signals SIG_Q1-SIG_Q4 to the H-bridge power stage 302, to control four corresponding switches in the H-bridge power stage 302, where the control signals SIG_Q1-SIG_Q4 are selected from the switching control signals CLK1 and CLK2, an always-on signal CLK100 and an always-off signal CLK0. The always-on signal CLK100 is used to always turn on the corresponding switch in the H-bridge power stage 302, and the always-off signal CLK0 is used to always turn off the corresponding switch in the H-bridge power stage 302. The H-bridge power stage 302 may further receive the input voltage VIN and the ground voltage GND through several voltage ports, and correspondingly output the output voltage VOUT through another voltage port. The H-bridge power stage 302 is composed of four switches configured to be coupled to a power storage device, which may be a passive device such as a capacitor or an inductor. Based on the allocations of the control signals SIG_Q1-SIG_Q4 and the corresponding voltage ports, the H-bridge power stage 302 in conjunction with the signal selector 310 may realize the switching-capacitor converter or the switching-inductor converter, to be adaptive to various power output applications. These switching converters may include, but not limited to, a charge pump, buck converter and boost converter.

Figure 4:
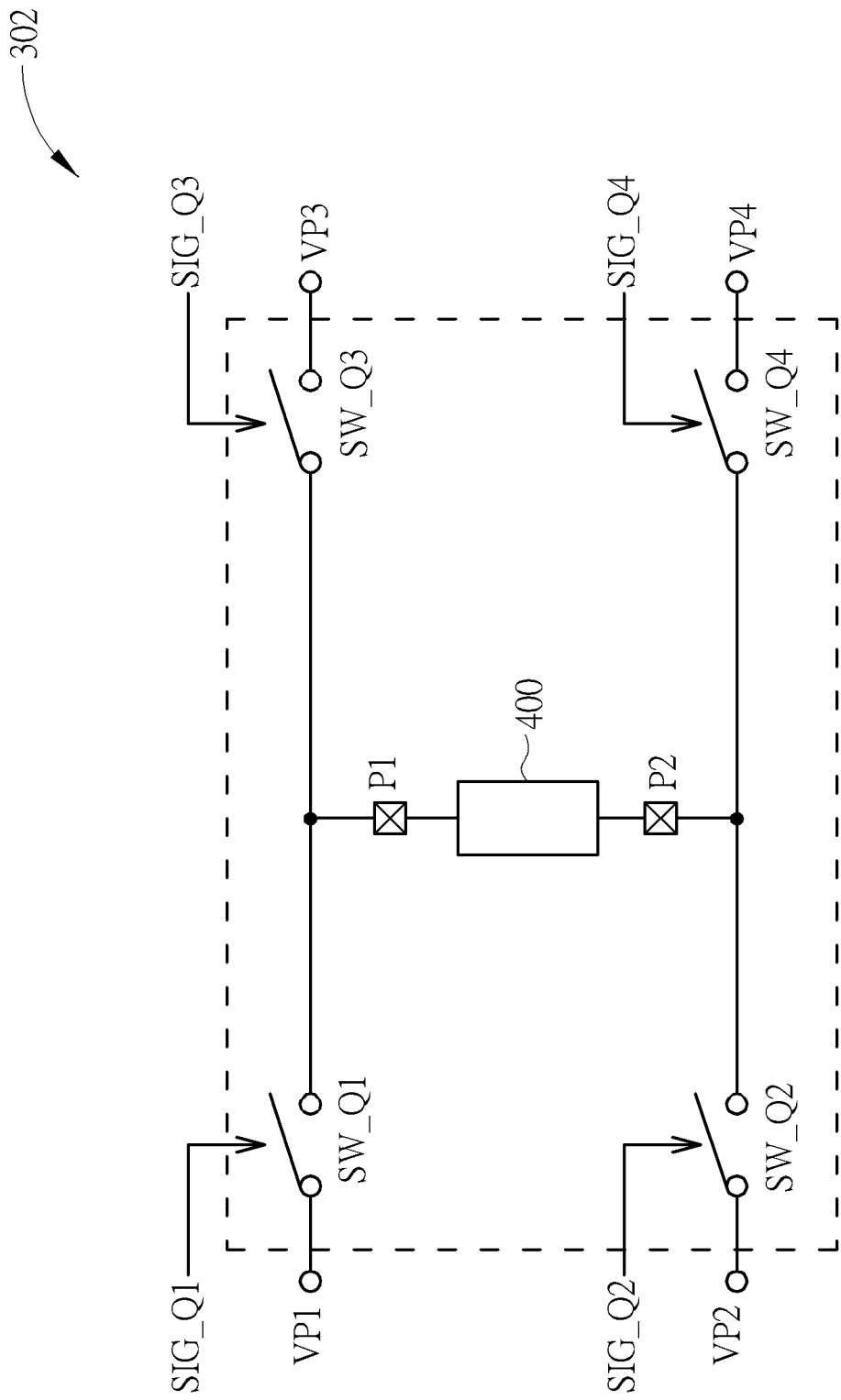
FIG. 4 is a schematic diagram of an exemplary structure of the H-bridge power stage.

Please refer to FIG. 4, which is a schematic diagram of an exemplary structure of the H-bridge power stage 302. As shown in FIG. 4, the H-bridge power stage 302 includes four switches SW_Q1-SW_4, which may be implemented with switching transistors such as PMOS transistor, NMOS transistor, and/or transmission gate. A power storage device 400 may be or may not be included in the H-bridge power stage 302, but is shown in FIG. 4 to facilitate the illustration. In an embodiment, the power storage device 400 may be a passive device externally coupled to the H-bridge power stage 302 through two device terminals, which may be implemented with I/O pads P1 and P2, respectively. The passive device may be, for example, a capacitor or an inductor, for realizing the switching-capacitor converter or the switching-inductor converter. In another embodiment, the passive device may be included in the IC, and thus the I/O pads P1 and P2 may be omitted.

As shown in FIG. 4, the switches SW_Q1-SW_Q4 are further coupled to voltage ports VP1-VP4, respectively. More specifically, the switch SW_Q1 is coupled between the voltage port VP1 and the I/O pad P1, the switch SW_Q2 is coupled between the voltage port VP2 and the I/O pad P2, the switch SW_Q3 is coupled between the voltage port VP3 and the I/O pad P1, and the switch SW_Q4 is coupled between the voltage port VP4 and the I/O pad P2. The upper terminal of the power storage device 400 is coupled to the I/O pad P1, to be further coupled to the switches SW_Q1 and SW_Q3. The lower terminal of the power storage device 400 is coupled to the I/O pad P2, to be further coupled to the switches SW_Q2 and SW_Q4.

In the H-bridge power stage 302, the switches SW_Q1-SW_Q4 are controlled by control signals SIG_Q1-SIG_Q4, respectively, which are output from the signal selector 310. Each of the voltage ports VP1-VP4 may be an input port configured to receive a power supply voltage selected from the input voltage VIN or the ground voltage GND, or may be an output port configured to output the output voltage VOUT to the loads of the switching converter 30. In an embodiment, if one of the voltage ports VP1-VP4 does not receive a power supply voltage or output the output voltage VOUT, this voltage port may be configured to be floating. Since the H-bridge power stage 302 is served as an output stage of the switching converter 30, at least one of the voltage ports VP1-VP4 should be configured as the output terminal for outputting the output voltage VOUT.

Figure 5:
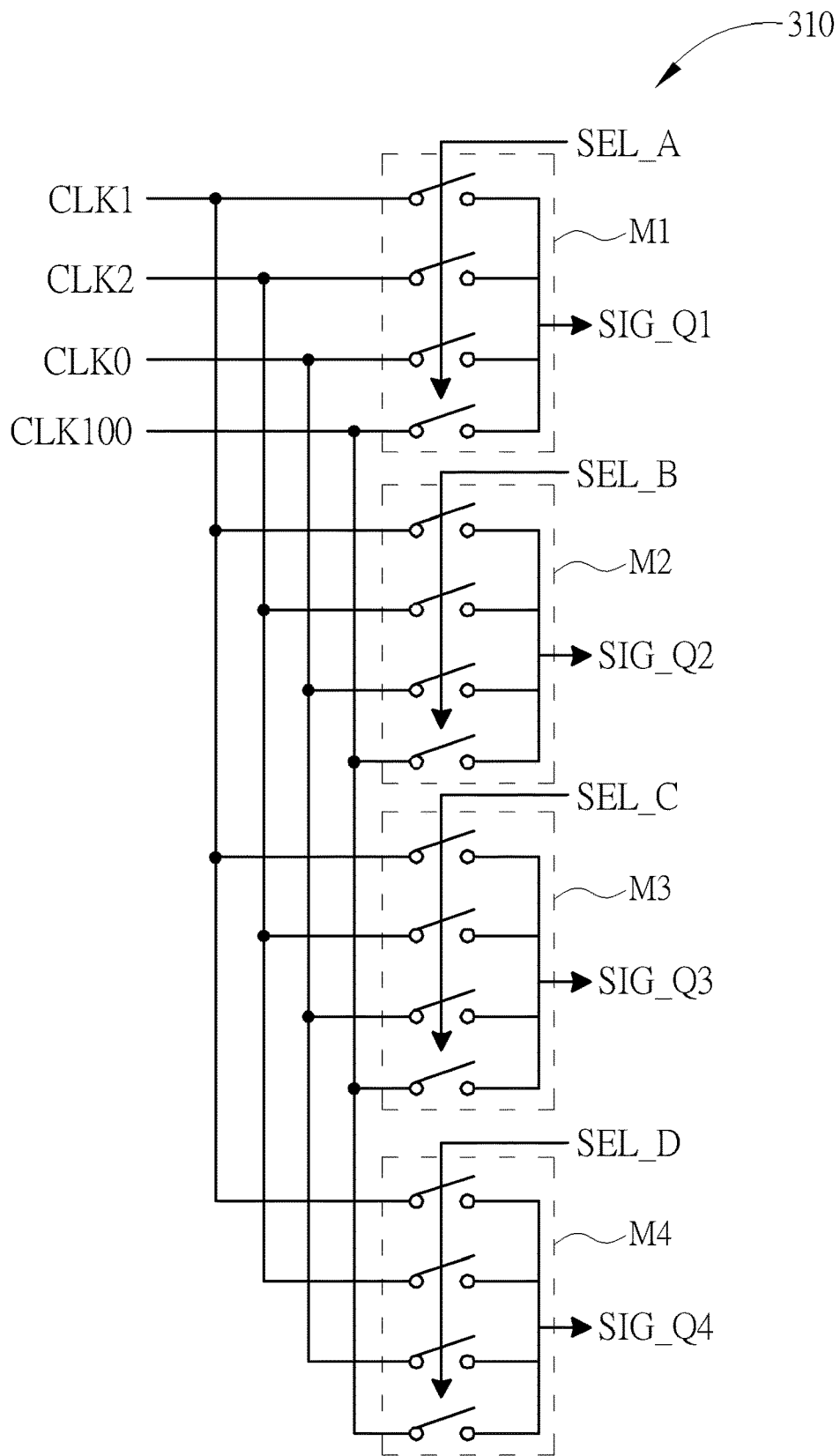
FIG. 5 is a schematic diagram of an exemplary structure of the signal selector.

Please refer to FIG. 5, which is a schematic diagram of an exemplary structure of the signal selector 310. The signal selector 310 is configured to select the control signals SIG_Q1-SIG_Q4 to be output to the H-bridge power stage 302. As shown in FIG. 5, the signal selector 310 includes several multiplexers (MUXs) M1-M4. Each of the MUXs M1-M4 is coupled to one of the switches SW_Q1-SW_Q4 of the H-bridge power stage 302. The MUXs M1-M4 are configured to output the control signals SIG_Q1-SIG_Q4 to the switches SW_Q1-SW_Q4, respectively, where each control signal SIG_Q1-SIG_Q4 is selected from one of the switching control signals CLK1 and CLK2, the always-on signal CLK100, and the always-off signal CLK0. The configurations of the MUXs M1-M4 are controlled through select signals SEL_A-SEL_D, respectively, which may be set by a user. Based on the configurations of the signal selector 310, the switching control signals CLK1 and CLK2, the always-on signal CLK100, and the always-off signal CLK0 may be appropriately allocated to the control signals SIG_Q1-SIG_Q4, while each of the voltage ports VP1-VP4 of the H-bridge power stage 302 is configured to receive the input voltage VIN or the ground voltage GND or output the output voltage VOUT accordingly, so as to configure the power supply circuit of the switching converter 30 to realize a charge pump, buck converter, boost converter, etc.

Therefore, as long as the control signals SIG_Q1-SIG_Q4 are allocated in an appropriate manner based on the connections of the voltage ports VP1-VP4 of the H-bridge power stage 302 and the deployments of the power storage device 400, the switching converter 30 may be applicable to any possible circumstances, to be adaptive to various requirements such as the high/low voltage level and heavy/light loading. In an embodiment, the universal switching converter 30 may be preconfigured before it is implemented in the circuit system, and a user or operator may set the select signals SEL_A-SEL_D in accordance with the connections of the voltage ports VP1-VP4 based on the application environments of the circuit system. For example, the switching converter 30 may be configured to realize a charge pump or a boost converter, allowing the source driver to output a higher voltage to drive the display panel with optimal power transmission efficiency.

Figure 6A:
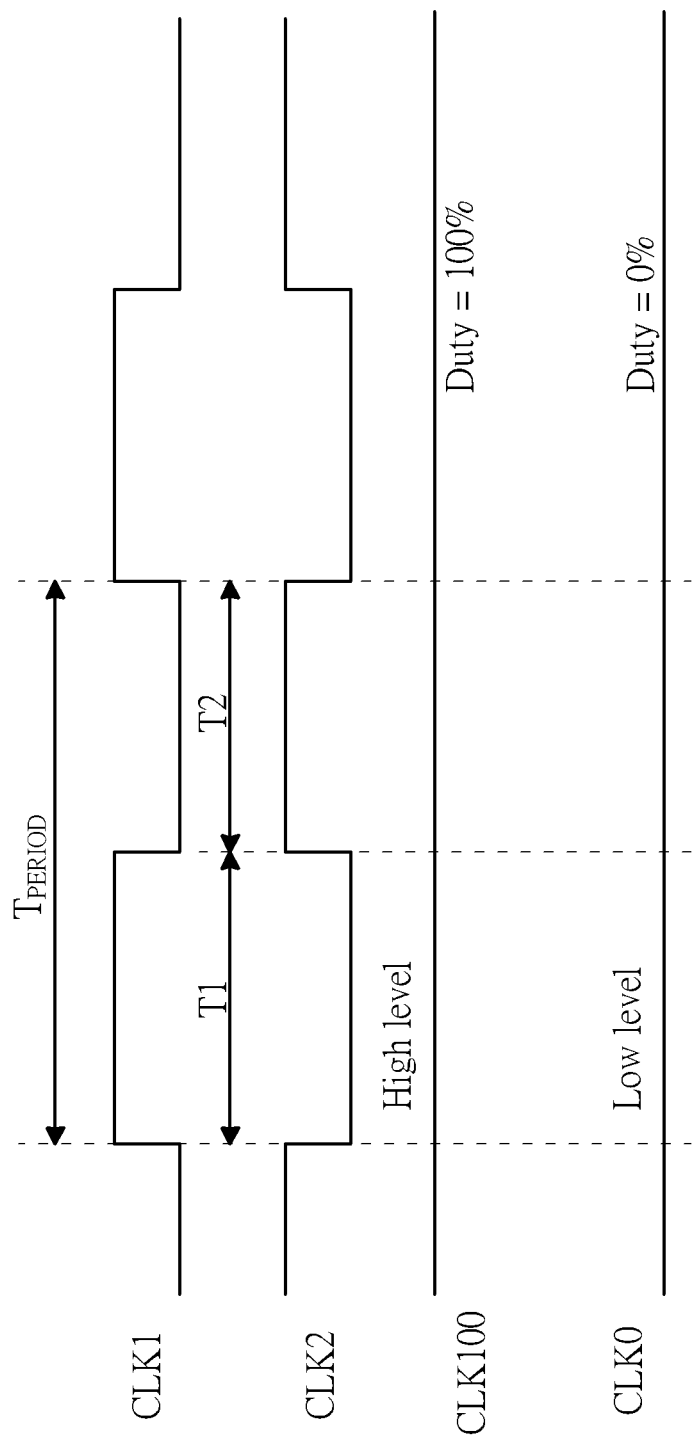
FIGS. 6A-6B are waveform diagrams illustrating exemplary waveforms of the control signals.

FIG. 6A illustrates exemplary waveforms of the control signals, where the switching control signals CLK1 and CLK2, the always-on signal CLK100 and the always-off signal CLK0 are shown. In general, the switching converter 30 has two operation phases: a charging phase and a discharging phase. The period T1 refers to the charging phase, where the switching control signal CLK1 is "High" and the switching control signal CLK2 is "Low". The period T2 refers to the discharging phase, where the switching control signal CLK1 is "Low" and the switching control signal CLK2 is "High". The charging phase and the discharging phase are performed alternately. The period $T_{PERIOD}$ is a cycle composed of one charging period T1 and one discharging period T2. In this embodiment, the switching control signal CLK1 and the switching control signal CLK2 are complementary signals, and the width of their duty cycle may be any appropriate value. In addition, the always-on signal CLK100 is kept at the "High" level throughout the period $T_{PERIOD}$ (i.e., the duty cycle equals 100%), so as to always turn on the corresponding switch. The always-off signal CLK0 is kept at the "Low" level throughout the period $T_{PERIOD}$ (i.e., the duty cycle equals 0%), so as to always turn off the corresponding switch.

Figure 6B:
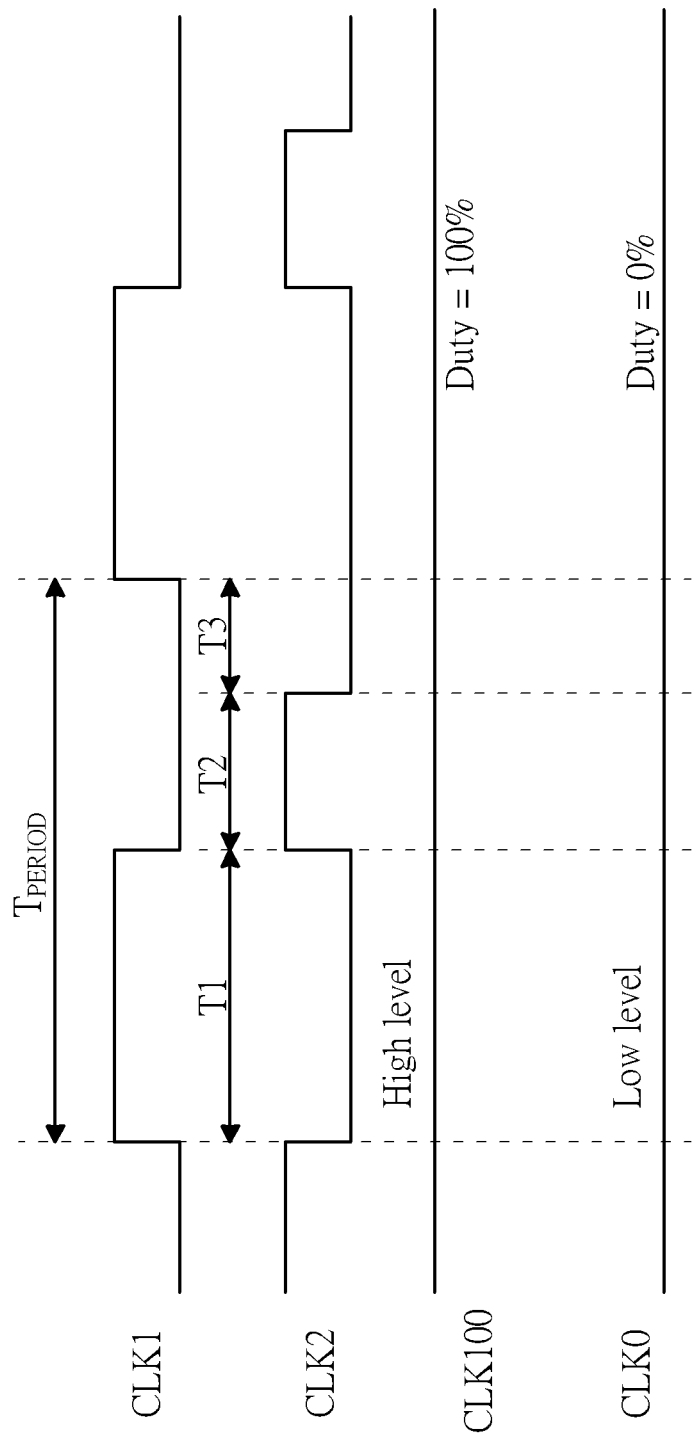

Please note that the switching control signals CLK1 and CLK2 may not need to be complementary to each other. FIG. 6B illustrates another exemplary waveforms of the control signals, where the switching control signals CLK1 and CLK2, the always-on signal CLK100 and the always-off signal CLK0 are shown. As shown in FIG. 6B, in addition to the charging period T1 and the discharging period T2, there is a period T3 where both the switching control signals CLK1 and CLK2 are "Low". In this embodiment, the switching control signal CLK1 and the switching control signal CLK2 are not complementary signals due to the allocation of the period T3, but the charging and discharging operations are still feasible. As long as the switching control signals CLK1 and CLK2 do not turn on the corresponding switches simultaneously, the switching converter 30 may be operated normally.

In the above embodiments as shown in FIGS. 6A and 6B, the control signals at "High" level may turn on the corresponding switches and at "Low" level may turn off the corresponding switches. The implementation of the present invention is not limited thereto. In another embodiment, a switch may be turned on by a control signal at the "Low" level, depending on the type of the switching transistor used to implement the switch. A person of ordinary skill in the art may apply appropriate control signals to turn on or off the switches based on the implementations of the transistors.

As can be seen, the H-bridge power stage 302 with the control of the signal selector 310 may be used to realize various types of switching converters, such as a positive charge pump, negative charge pump, buck converter, boost converter, inverting buck-boost converter, non-inverting buck-boost converter, and single inductor dual output (SIDO) DC-DC converter. Detailed implementations of the control signals SIG_Q1-SIG_Q4 and the connections of the voltage ports VP1-VP4 for these switching converters are summarized in Table 1, as shown below:

TABLE 1

| Switching Converter | Passive device | SIG_Q1 | SIG_Q2 | SIG_Q3 | SIG_Q4 |
|---|---|---|---|---|---|
| Positive Charge pump | Capacitor | CLK1 | CLK1 | CLK2 | CLK2 |
| Negative Charge Pump | | CLK1 | CLK1 | CLK2 | CLK2 |
| Buck | Inductor | CLK1 | CLK0 | CLK2 | CLK100 |
| Boost | | CLK100 | CLK1 | CLK0 | CLK2 |
| Inverting Buck-Boost | | CLK1 | CLK100 | CLK2 | CLK0 |
| Non-Inverting Buck-Boost | | CLK1 | CLK1 | CLK2 | CLK2 |
| Single Inductor Dual Output | | CLK1 | CLK1 | CLK2 | CLK2 |

| Switching Converter | VP1 | VP2 | VP3 | VP4 | Output voltage |
|---|---|---|---|---|---|
| Positive Charge pump | VIN | GND | VOUT | VIN | VOUT = VIN × 2 |
| Negative Charge Pump | VIN | GND | GND | VOUT | VOUT = −VIN |
| Buck | VIN | NC | GND | VOUT | VOUT = VIN × D |
| Boost | VIN | GND | NC | VOUT | VOUT = VIN/(1 − D) |
| Inverting Buck-Boost | VIN | GND | VOUT | NC | VOUT = −VIN × D/(1 − D) |
| Non-Inverting Buck-Boost | VIN | GND | GND | VOUT | VOUT = VIN × D/(1 − D) |
| Single Inductor Dual Output | VIN | GND | VOUT_N | VOUT_P | VOUT_P = VIN × D<br>VOUT_N = −VIN × D/(1 − D) |

The related implementations of the voltage ports VP1-VP4 and the control signals SIG_Q1-SIG_Q4 are illustrated in FIG. 4 and related paragraphs. Note that several of the voltage ports VP1-VP4 are labeled as "NC", which means that the voltage port may be connected to any node or may be floating. This is because the switch corresponding to this voltage port receives the always-off signal CLK0, and the connection of the voltage port will not influence the operations of the H-bridge power stage 302.

Table 1 also shows the value of the output voltage VOUT in each type of switching converter. Note that these switching converters may include the charging phase (as the charging period T1 shown in FIGS. 6A and 6B) and the discharging phase (as the discharging period T2 shown in FIGS. 6A and 6B), and D refers to the duty cycle of the switching control signal CLK1, which is equal to the length of the charging period T1 divided by the total length of the period $T_{PERIOD}$.

Therefore, based on the allocations of the connections of the voltage ports VP1-VP4 and the related control signals SIG_Q1-SIG_Q4, the H-bridge power stage 302 may be implemented to realize various types of switching converters, to be adaptive to different output voltages and loadings. When the output voltage requirement changes, only the connections of the voltage ports VP1-VP4 and the allocations of the control signals SIG_Q1-SIG_Q4 need to be adjusted, which can easily be achieved without modifying the structure of the H-bridge power stage 302. The detailed implementations of several types of switching converters are illustrated in the following paragraphs.

Figure 7:
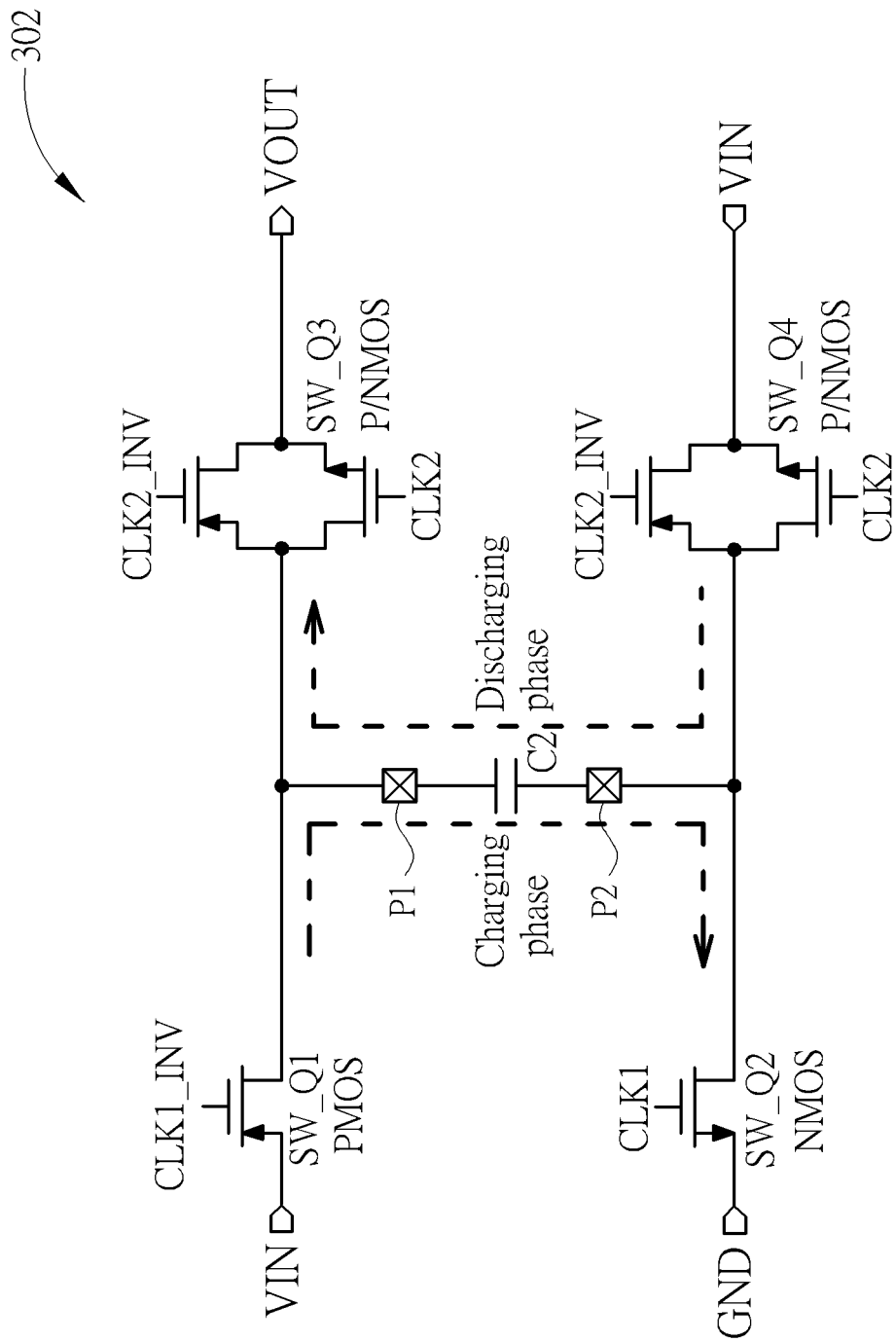
FIG. 7 is a schematic diagram of the H-bridge power stage served to realize a positive charge pump.

Please refer to FIG. 7, which is a schematic diagram of the H-bridge power stage 302 served to realize a positive charge pump. As shown in FIG. 7, the power storage device is a capacitor C2. In an embodiment, the capacitor C2 is an off-chip capacitor, which is coupled to the H-bridge power stage 302 in a power supply IC through the I/O pads P1 and P2. The switch SW_Q1 may be implemented with a PMOS transistor, the switch SW_Q2 may be implemented with an NMOS transistor, and each of the switches SW_Q3 and SW_Q4 may be implemented with a transmission gate composed of a PMOS transistor and an NMOS transistor. The switch SW_Q1 is controlled by the inverse switching control signal CLK1_INV, the switch SW_Q2 is controlled by the switching control signal CLK1, the switch SW_Q3 is controlled by the switching control signal CLK2 and its inverse switching control signal CLK2_INV, and the switch SW_Q4 is controlled by the switching control signal CLK2 and its inverse switching control signal CLK2_INV. Correspondingly, the voltage ports VP1 and VP4 are configured to receive the input voltage VIN, the voltage port VP2 is configured to receive the ground voltage GND, and the voltage port VP3 is configured to output the output voltage VOUT.

More specifically, based on the switching control signals CLK1 and CLK2 received from the signal controller 308, the always-on signal CLK100 and the always-off signal CLK0, the signal selector 310 may select the switching control signal CLK1 to generate the control signals SIG_Q1 and SIG_Q2 for the switches SW_Q1 and SW_Q2, and select the switching control signal CLK2 to generate the control signals SIG_Q3 and SIG_Q4 for the switches SW_Q3 and SW_Q4. In detail, since the switch SW_Q1 is a PMOS transistor, the switching control signal CLK1 may be inverted to generate the inverse switching control signal CLK1_INV to be sent to the switch SW_Q1. The switching control signal CLK1 may also be sent to the NMOS transistor of the switch SW_Q2. Since the switches SW_Q3 and SW_Q4 are transmission gates, the switching control signal CLK2 and its inverse switching control signal CLK2_INV are both sent to the switches SW_Q3 and SW_Q4.

Therefore, in the charging phase, the switches SW_Q1 and SW_Q2 are turned on and the switches SW_Q3 and SW_Q4 are turned off, and the capacitor C2 is charged through a charging path from the input terminal of VIN to the ground terminal. In the discharging phase, the switches SW_Q3 and SW_Q4 are turned on and the switches SW_Q1 and SW_Q2 are turned off, and the capacitor C2 is discharged through a discharging path to the output terminal of VOUT. In this embodiment, the output voltage VOUT will be approximately equal to VIN×2.

Figure 8:
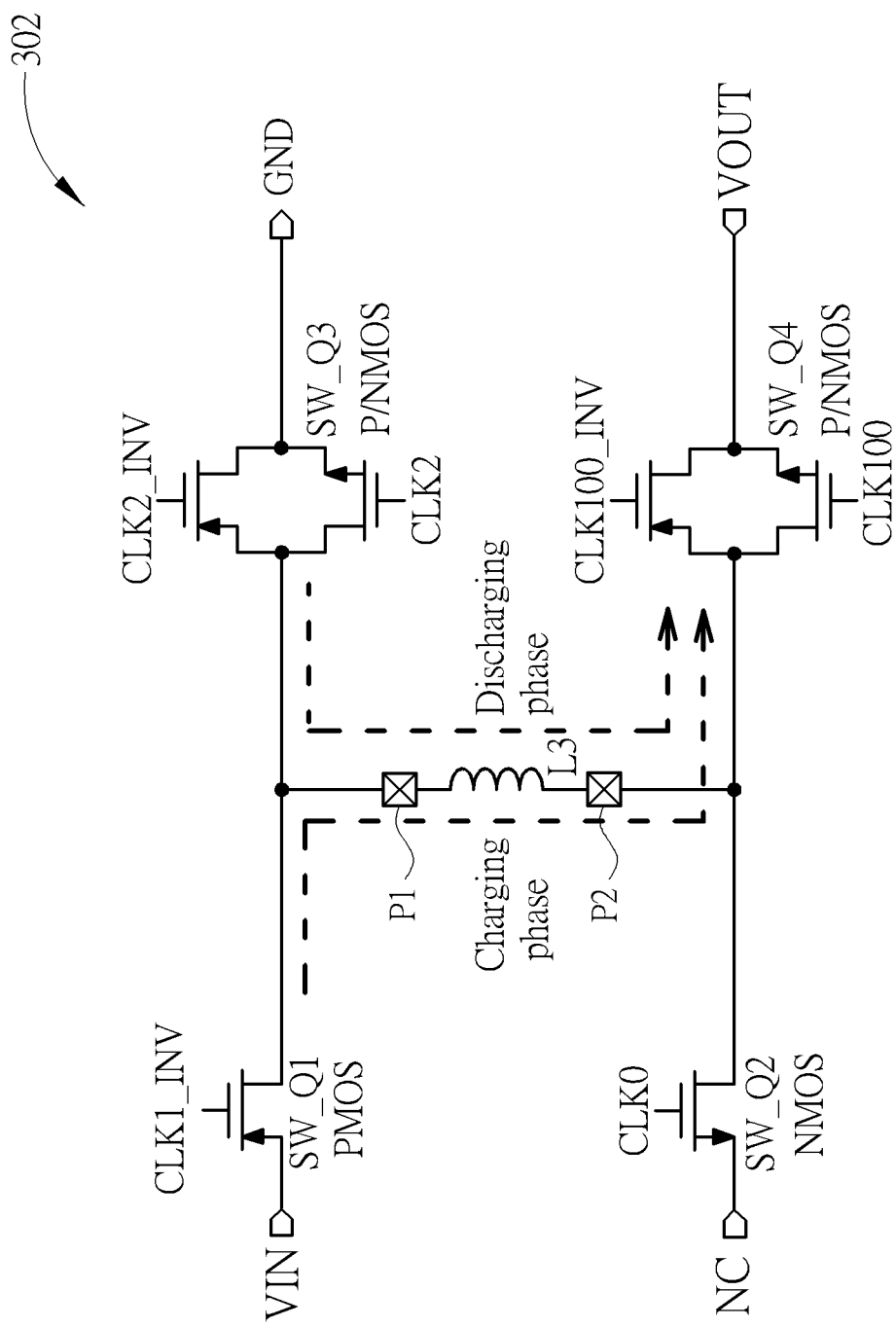
FIG. 8 is a schematic diagram of the H-bridge power stage served to realize a buck converter.

Please refer to FIG. 8, which is a schematic diagram of the H-bridge power stage 302 served to realize a buck converter. As shown in FIG. 8, the power storage device is an inductor L3. In an embodiment, the inductor L3 is an off-chip inductor, which is coupled to the H-bridge power stage 302 in a power supply IC through the I/O pads P1 and P2. The switch SW_Q1 may be implemented with a PMOS transistor, the switch SW_Q2 may be implemented with an NMOS transistor, and each of the switches SW_Q3 and SW_Q4 may be implemented with a transmission gate composed of a PMOS transistor and an NMOS transistor. The switch SW_Q1 is controlled by the inverse switching control signal CLK1_INV, the switch SW_Q2 is controlled by the always-off signal CLK0, the switch SW_Q3 is controlled by the switching control signal CLK2 and its inverse switching control signal CLK2_INV, and the switch SW_Q4 is controlled by the always-on signal CLK100 and the inverse always-on signal CLK100_INV. Correspondingly, the voltage port VP1 is configured to receive the input voltage VIN, the voltage port VP2 may be floating or coupled to any node since the corresponding switch SW_Q2 is always off, the voltage port VP3 is configured to receive the ground voltage GND, and the voltage port VP4 is configured to output the output voltage VOUT.

More specifically, based on the switching control signals CLK1 and CLK2 received from the signal controller 308, the always-on signal CLK100 and the always-off signal CLK0, the signal selector 310 may select the switching control signal CLK1 to generate the control signal SIG_Q1 for the switch SW_Q1, select the always-off signal CLK0 to generate the control signal SIG_Q2 for the switch SW_Q2, select the switching control signal CLK2 to generate the control signal SIG_Q3 for the switch SW_Q3, and select the always-on signal CLK100 to generate the control signal SIG_Q4 for the switch SW_Q4. In detail, since the switch SW_Q1 is a PMOS transistor, the switching control signal CLK1 may be inverted to generate the inverse switching control signal CLK1_INV to be sent to the switch SW_Q1. The always-off signal CLK0 may be sent to the NMOS transistor of the switch SW_Q2. Since the switch SW_Q3 is a transmission gate, the switching control signal CLK2 and its inverse switching control signal CLK2_INV are both sent to the switch SW_Q3. Since the switch SW_Q4 is a transmission gate, the always-on signal CLK100 and the inverse always-on signal CLK100_INV are both sent to the switch SW_Q4.

Therefore, in the charging phase, the switches SW_Q1 and SW_Q4 are turned on and the switches SW_Q2 and SW_Q3 are turned off, and the inductor L3 is charged through a charging path from the input terminal of VIN to the output terminal of VOUT. In the discharging phase, the switches SW_Q3 and SW_Q4 are turned on and the switches SW_Q1 and SW_Q2 are turned off, and the inductor L3 is discharged through a discharging path from the ground terminal to the output terminal of VOUT. In this embodiment, the output voltage VOUT will be equal to VIN×D, where D is the duty cycle of the switching control signal CLK1.

Figure 9:
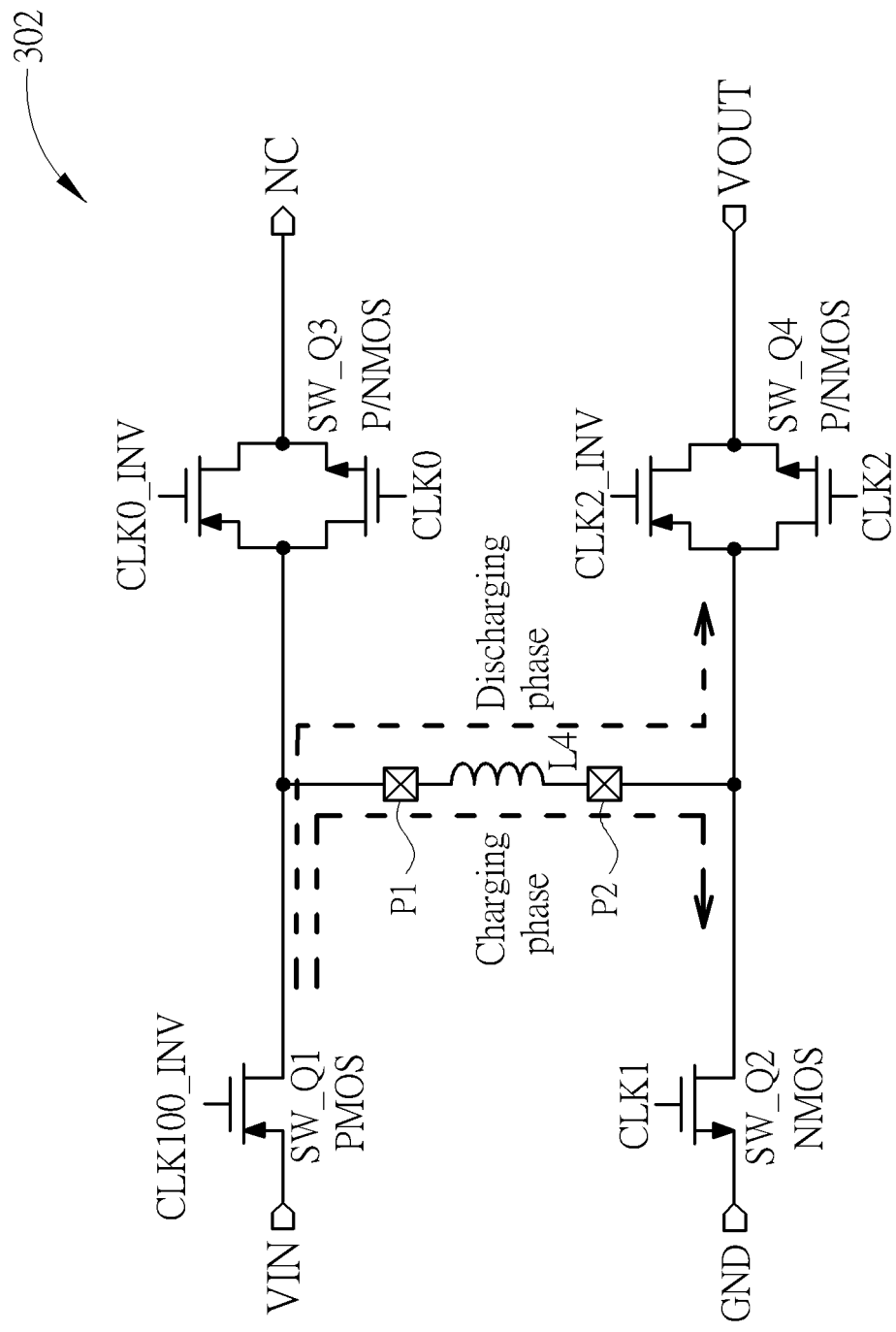
FIG. 9 is a schematic diagram of the H-bridge power stage served to realize a boost converter.

Please refer to FIG. 9, which is a schematic diagram of the H-bridge power stage 302 served to realize a boost converter. As shown in FIG. 9, the power storage device is an inductor L4. In an embodiment, the inductor L4 is an off-chip inductor, which is coupled to the H-bridge power stage 302 in a power supply IC through the I/O pads P1 and P2. The switch SW_Q1 may be implemented with a PMOS transistor, the switch SW_Q2 may be implemented with an NMOS transistor, and each of the switches SW_Q3 and SW_Q4 may be implemented with a transmission gate composed of a PMOS transistor and an NMOS transistor. The switch SW_Q1 is controlled by the inverse always-on signal CLK100_INV, the switch SW_Q2 is controlled by the switching control signal CLK1, the switch SW_Q3 is controlled by the always-off signal CLK0 and the inverse always-off signal CLK0_INV, and the switch SW_Q4 is controlled by the switching control signal CLK2 and its inverse switching control signal CLK2_INV. Correspondingly, the voltage port VP1 is configured to receive the input voltage VIN, the voltage port VP2 is configured to receive the ground voltage GND, the voltage port VP3 may be floating or coupled to any node since the corresponding switch SW_Q3 is always off, and the voltage port VP4 is configured to output the output voltage VOUT.

More specifically, based on the switching control signals CLK1 and CLK2 received from the signal controller 308, the always-on signal CLK100 and the always-off signal CLK0, the signal selector 310 may select the always-on signal CLK100 to generate the control signal SIG_Q1 for the switch SW_Q1, select the switching control signal CLK1 to generate the control signal SIG_Q2 for the switch SW_Q2, select the always-off signal CLK0 to generate the control signal SIG_Q3 for the switch SW_Q3, and select the switching control signal CLK2 to generate the control signal SIG_Q4 for the switch SW_Q4. In detail, since the switch SW_Q1 is a PMOS transistor, the always-on signal CLK100 may be inverted to generate the inverse always-on signal CLK100_INV to be sent to the switch SW_Q1. The switching control signal CLK1 may be sent to the NMOS transistor of the switch SW_Q2. Since the switch SW_Q3 is a transmission gate, the always-off signal CLK0 and the inverse always-off signal CLK0_INV are both sent to the switch SW_Q3. Since the switch SW_Q4 is a transmission gate, the switching control signal CLK2 and its inverse switching control signal CLK2_INV are both sent to the switch SW_Q4.

Therefore, in the charging phase, the switches SW_Q1 and SW_Q2 are turned on and the switches SW_Q3 and SW_Q4 are turned off, and the inductor L4 is charged through a charging path from the input terminal of VIN to the ground terminal. In the discharging phase, the switches SW_Q1 and SW_Q4 are turned on and the switches SW_Q2 and SW_Q3 are turned off, and the inductor L4 is discharged through a discharging path from the input terminal of VIN to the output terminal of VOUT. In this embodiment, the output voltage VOUT will be equal to $VIN/(1-D)$, where D is the duty cycle of the switching control signal CLK1.

Figure 10:
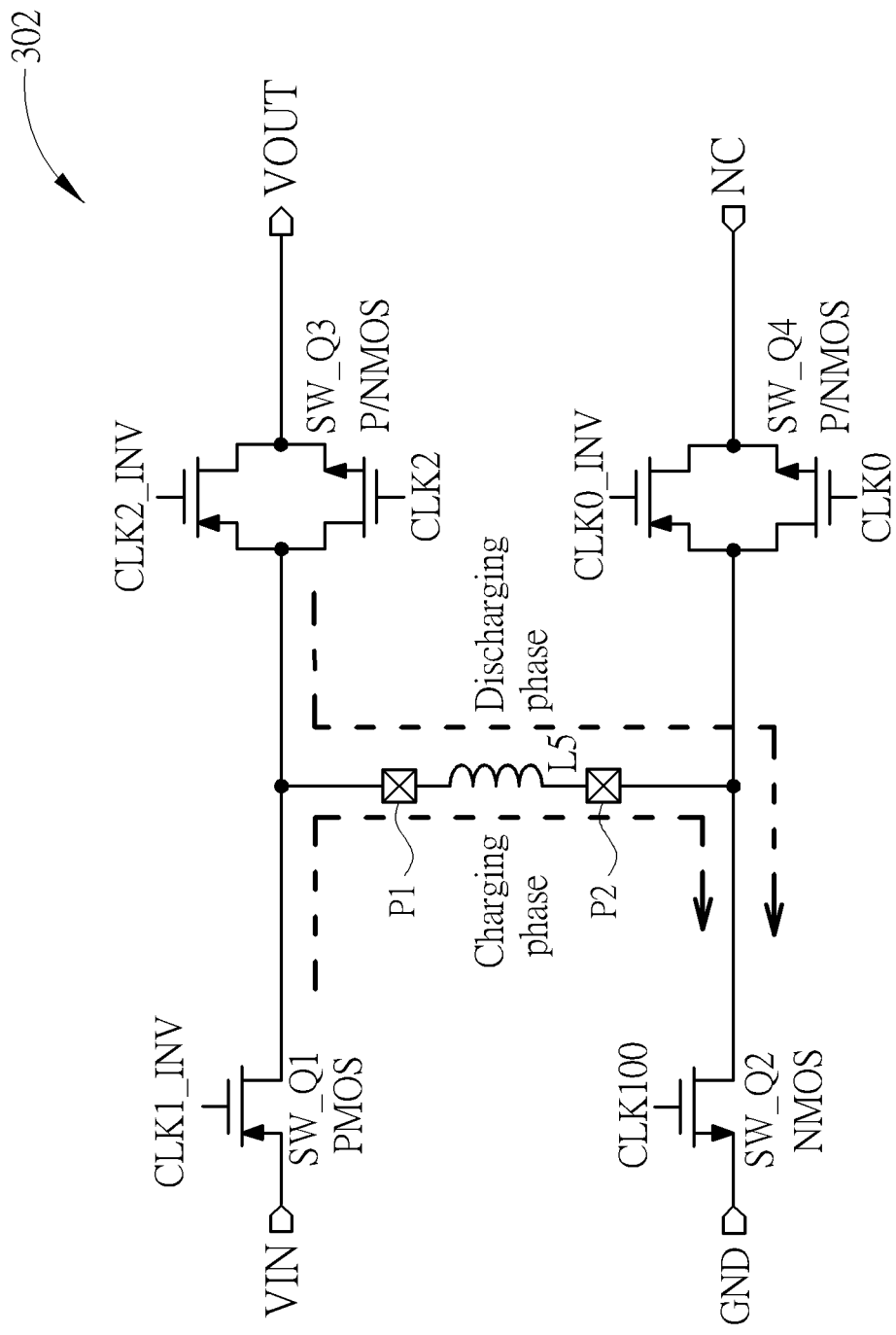
FIG. 10 is a schematic diagram of the H-bridge power stage served to realize an inverting buck-boost converter.

Please refer to FIG. 10, which is a schematic diagram of the H-bridge power stage 302 served to realize an inverting buck-boost converter. As shown in FIG. 10, the power storage device is an inductor L5. In an embodiment, the inductor L5 is an off-chip inductor, which is coupled to the H-bridge power stage 302 in a power supply IC through the I/O pads P1 and P2. The switch SW_Q1 may be implemented with a PMOS transistor, the switch SW_Q2 may be implemented with an NMOS transistor, and each of the switches SW_Q3 and SW_Q4 may be implemented with a transmission gate composed of a PMOS transistor and an NMOS transistor. The switch SW_Q1 is controlled by the inverse switching control signal CLK1_INV, the switch SW_Q2 is controlled by the always-on signal CLK100, the switch SW_Q3 is controlled by the switching control signal CLK2 and its inverse switching control signal CLK2_INV, and the switch SW_Q4 is controlled by the always-off signal CLK0 and the inverse always-off signal CLK0_INV. Correspondingly, the voltage port VP1 is configured to receive the input voltage VIN, the voltage port VP2 is configured to receive the ground voltage GND, the voltage port VP3 is configured to output the output voltage VOUT, and the voltage port VP4 may be floating or coupled to any node since the corresponding switch SW_Q4 is always off.

More specifically, based on the switching control signals CLK1 and CLK2 received from the signal controller 308, the always-on signal CLK100 and the always-off signal CLK0, the signal selector 310 may select the switching control signal CLK1 to generate the control signal SIG_Q1 for the switch SW_Q1, select the always-on signal CLK100 to generate the control signal SIG_Q2 for the switch SW_Q2, select the switching control signal CLK2 to generate the control signal SIG_Q3 for the switch SW_Q3, and select the always-off signal CLK0 to generate the control signal SIG_Q4 for the switch SW_Q4. In detail, since the switch SW_Q1 is a PMOS transistor, the switching control signal CLK1 may be inverted to generate the inverse switching control signal CLK1_INV to be sent to the switch SW_Q1. The always-on signal CLK100 may be sent to the NMOS transistor of the switch SW_Q2. Since the switch SW_Q3 is a transmission gate, the switching control signal CLK2 and its inverse switching control signal CLK2_INV are both sent to the switch SW_Q3. Since the switch SW_Q4 is a transmission gate, the always-off signal CLK0 and the inverse always-off signal CLK0_INV are both sent to the switch SW_Q4.

Therefore, in the charging phase, the switches SW_Q1 and SW_Q2 are turned on and the switches SW_Q3 and SW_Q4 are turned off, and the inductor L5 is charged through a charging path from the input terminal of VIN to the ground terminal. In the discharging phase, the switches SW_Q2 and SW_Q3 are turned on and the switches SW_Q1 and SW_Q4 are turned off, and the inductor L5 is discharged through a discharging path from the output terminal of VOUT to the ground terminal. In this embodiment, the output voltage VOUT will be equal to $-VIN \times D/(1-D)$, where D is the duty cycle of the switching control signal CLK1.

Figure 11:
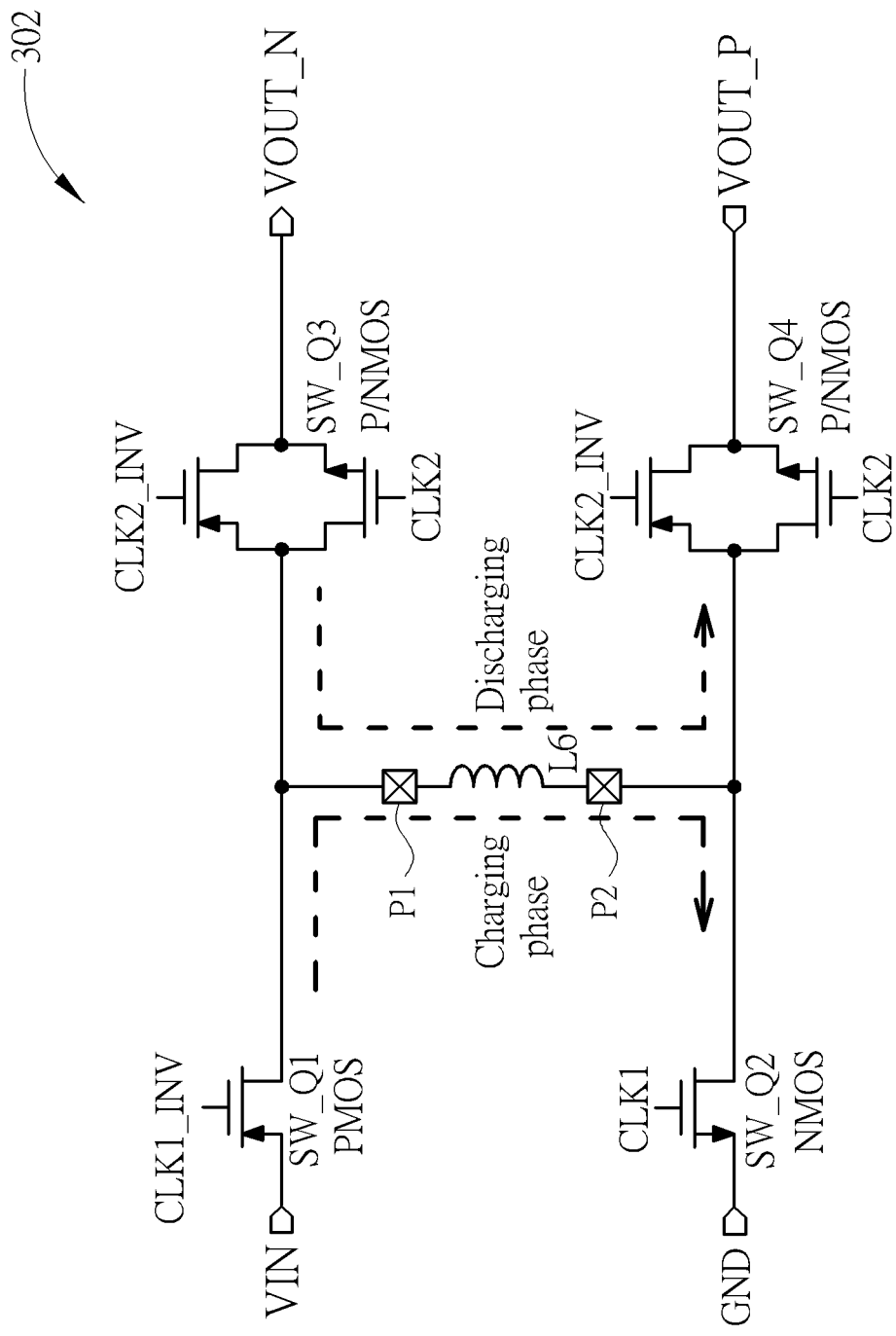
FIG. 11 is a schematic diagram of the H-bridge power stage served to realize a SIDO DC-DC converter.

Please refer to FIG. 11, which is a schematic diagram of the H-bridge power stage 302 served to realize a SIDO DC-DC converter. As shown in FIG. 11, the power storage device is an inductor L6. In an embodiment, the inductor L6 is an off-chip inductor, which is coupled to the H-bridge power stage 302 in a power supply IC through the I/O pads P1 and P2. The switch SW_Q1 may be implemented with a PMOS transistor, the switch SW_Q2 may be implemented with an NMOS transistor, and each of the switches SW_Q3 and SW_Q4 may be implemented with a transmission gate composed of a PMOS transistor and an NMOS transistor. The switch SW_Q1 is controlled by the inverse switching control signal CLK1_INV, the switch SW_Q2 is controlled by the switching control signal CLK1, the switch SW_Q3 is controlled by the switching control signal CLK2 and its inverse switching control signal CLK2_INV, and the switch SW_Q4 is controlled by the switching control signal CLK2 and its inverse switching control signal CLK2_INV. Correspondingly, the voltage port VP1 is configured to receive the input voltage VIN, the voltage port VP2 is configured to receive the ground voltage GND, the voltage port VP3 is configured to output a negative output voltage VOUT_N, and the voltage port VP4 is configured to output a positive output voltage VOUT_P. In this embodiment, two of the voltage ports VP1-VP4 are output ports.

More specifically, based on the switching control signals CLK1 and CLK2 received from the signal controller 308, the always-on signal CLK100 and the always-off signal CLK0, the signal selector 310 may select the switching control signal CLK1 to generate the control signals SIG_Q1 and SIG_Q2 for the switches SW_Q1 and SW_Q2, and select the switching control signal CLK2 to generate the control signals SIG_Q3 and SIG_Q4 for the switches SW_Q3 and SW_Q4. In detail, since the switch SW_Q1 is a PMOS transistor, the switching control signal CLK1 may be inverted to generate the inverse switching control signal CLK1_INV to be sent to the switch SW_Q1. The switching control signal CLK1 may also be sent to the NMOS transistor of the switch SW_Q2. Since the switches SW_Q3 and SW_Q4 are transmission gates, the switching control signal CLK2 and its inverse switching control signal CLK2_INV are both sent to the switches SW_Q3 and SW_Q4.

Therefore, in the charging phase, the switches SW_Q1 and SW_Q2 are turned on and the switches SW_Q3 and SW_Q4 are turned off, and the inductor L6 is charged through a charging path from the input terminal of VIN to the ground terminal. In the discharging phase, the switches SW_Q3 and SW_Q4 are turned on and the switches SW_Q1 and SW_Q2 are turned off, and the inductor L6 is discharged through a discharging path from the negative output terminal of VOUT_N to the positive output terminal of VOUT_P. In this embodiment, the positive output voltage VOUT_P will be equal to VIN×D, and the negative output voltage VOUT_N will be equal to −VIN×D/(1−D), where D is the duty cycle of the switching control signal CLK1.

In an embodiment, the SIDO may additionally include other discharging phases for outputting currents to the negative output terminal or the positive output terminal only. Such a discharging phase may be achieved by turning on the switches SW_Q1 and SW_Q4 simultaneously, or turning on the switches SW_Q2 and SW_Q3 simultaneously. The related control methods also belong to the scope of the present invention.

Please note that the present invention aims at providing an H-bridge power stage which is configured with voltage port connections and switching controls to be adaptive to various types of switching converters. Those skilled in the art may make modifications and alterations accordingly. For example, the H-bridge power stage of the present invention may be applicable to any type of switching-capacitor converter and switching-inductor converter having a passive device with several switching transistors, and the applications should not be limited to those shown in Table 1 or described in the above paragraphs.

In addition, in the H-bridge power stage composed of four switches, each of these four switches may be implemented with a single PMOS transistor, a single NMOS transistor or a transmission gate. The deployments of the switch type may be determined based on the voltage level of each voltage port, where one or more appropriate switching transistors may be applied to each switch so as to conduct or isolate the charging/discharging currents normally in any possible voltage level. The implementations of the switch type should not be limited to those described in this disclosure.

Furthermore, the embodiments shown in FIGS. 7-11 are merely served to illustrate exemplary configurations of the H-bridge power stage for realizing various types of switching converters. The deployments of the voltage ports and the corresponding control signals may be changed or adjusted according to system requirements. For example, in another embodiment, the connections of the voltage ports V1 and V2 may be interchanged, and the connections of the voltage ports V3 and V4 may be interchanged. Correspondingly, the allocations of the control signals SIG_Q1 and SIG_Q2 for the switches SW_Q1 and SW_Q2 may be interchanged, and the allocations of the control signals SIG_Q3 and SIG_Q4 for the switches SW_Q3 and SW_Q4 may be interchanged. The configuration of the H-bridge power stage after the interchanges may still operate normally to realize the voltage output functions.

To sum up, the present invention provides a universal power stage for a switching converter. The universal power stage may be an H-bridge power stage, which includes four switches configured to be coupled to a power storage device such as a capacitor or an inductor, so as to realize the switching-capacitor converter or the switching-inductor converter. Based on the connections of the voltage ports and the allocations of the control signals, the H-bridge power stage in conjunction with a signal selector that provides the control signals may be used to realize a positive charge pump, negative charge pump, buck converter, boost converter, inverting buck-boost converter, non-inverting buck-boost converter, and SIDO DC-DC converter, but not limited thereto. As a result, the switching converter implemented with the H-bridge power stage may be applicable to any possible circumstances, to be adaptive to various requirements such as the high/low voltage level and heavy/light loading.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply circuit for realizing a plurality of types of switching converters, comprising:
    a power stage, having a first voltage port, a second voltage port, a third voltage port and a fourth voltage port, and having a first device terminal and a second device terminal configured to be coupled to a power storage device, the power stage comprising:
        a first switch, coupled between the first voltage port and the first device terminal;
        a second switch, coupled between the second voltage port and the second device terminal;
        a third switch, coupled between the third voltage port and the first device terminal; and
        a fourth switch, coupled between the fourth voltage port and the second device terminal; and
    a signal selector, coupled to the power stage, configured to select one of a plurality of control signals to be output to each of the first switch, the second switch, the third switch and the fourth switch;
    wherein the signal selector selects a first control signal, a second control signal, a third control signal and a fourth control signal from the plurality of control signals to be output to the first switch, the second switch, the third switch and the fourth switch, respectively, and at least one of the first voltage port, the second voltage port, the third voltage port and the fourth voltage port is configured to selectively receive an input voltage, receive a ground voltage, output an output voltage, or be floating, to realize one of the plurality of types of switching converters.

2. The power supply circuit of claim 1, wherein the power storage device is a capacitor or an inductor.

3. The power supply circuit of claim 1, wherein the first device terminal of the power stage is coupled to a first terminal of the power storage device, and the second device terminal of the power stage is coupled to a second terminal of the power storage device.

4. The power supply circuit of claim 1, wherein the plurality of control signals are selected from at least one of an always-on signal, an always-off signal and at least one switching control signal.

5. The power supply circuit of claim 4, wherein the always-on signal is used to always turn on a corresponding switch among the first switch, the second switch, the third switch and the fourth switch, and the always-off signal is used to always turn off a corresponding switch among the first switch, the second switch, the third switch and the fourth switch.

6. The power supply circuit of claim 1, wherein the signal selector comprises:
a plurality of multiplexers, each coupled to one of the first switch, the second switch, the third switch and the fourth switch.

7. The power supply circuit of claim 1, wherein the switching converter comprises:
a feedback circuit, coupled to the power stage, configured to receive an output voltage from the power stage, and generate a feedback signal according to the output voltage;
an error amplifier, coupled to the feedback circuit, configured to generate an error signal according to the feedback signal, and output the error signal; and
a signal controller, coupled between the error amplifier and the signal selector, configured to generate a switching control signal according to the error signal, and output the switching control signal to the signal selector.

8. The power supply circuit of claim 1, wherein at least one of the first voltage port, the second voltage port, the third voltage port and the fourth voltage port is configured to receive a power supply voltage selected from the input voltage of the switching converter and the ground voltage.

9. The power supply circuit of claim 8, wherein at least one of the first voltage port, the second voltage port, the third voltage port and the fourth voltage port not receiving the power supply voltage is configured to output the output voltage of the switching converter.

10. The power supply circuit of claim 8, wherein one of the first voltage port, the second voltage port, the third voltage port and the fourth voltage port not receiving the power supply voltage is configured to be floating.

11. The power supply circuit of claim 8, wherein the power storage device is a capacitor, the first voltage port and the fourth voltage port are configured to receive the input voltage of the switching converter, the second voltage port is configured to receive the ground voltage, and the third voltage port is configured to output an output voltage of the switching converter.

12. The power supply circuit of claim 11, wherein the signal selector is configured to receive a first switching control signal and a second switching control signal among the plurality of control signals from a signal controller of the switching converter, select the first switching control signal to control the first switch and the second switch, and select the second switching control signal to control the third switch and the fourth switch.

13. The power supply circuit of claim 8, wherein the power storage device is an inductor, the first voltage port is configured to receive the input voltage of the switching converter, the second voltage port is configured to receive the ground voltage, and the fourth voltage port is configured to output an output voltage of the switching converter.

14. The power supply circuit of claim 13, wherein the signal selector is configured to receive a first switching control signal and a second switching control signal among the plurality of control signals from a signal controller of the switching converter, select an always-on signal to control the first switch, select the first switching control signal to control the second switch, select an always-off signal to control the third switch, and select the second switching control signal to control the fourth switch.

15. The power supply circuit of claim 1, wherein the first voltage port and the fourth voltage port are configured to receive a first input voltage, the second voltage port is configured to receive the ground voltage, and the third voltage port is configured to output a first output voltage to realize a first switching converter among the plurality of switching converters, and the first voltage port is configured to receive a second input voltage, the second voltage port is configured to receive the ground voltage, and the fourth voltage port is configured to output a second output voltage to realize a second switching converter among the plurality of switching converters.

* * * * *